(12) United States Patent
Zhang et al.

(10) Patent No.: US 12,154,695 B2
(45) Date of Patent: Nov. 26, 2024

(54) NUCLEAR REACTOR MAIN HEAT AND WASTE HEAT INTEGRATED THERMAL EXCHANGER

(71) Applicant: XI'AN JIAOTONG UNIVERSITY, Shaanxi (CN)

(72) Inventors: Dalin Zhang, Shaanxi (CN); Shichang Yun, Shaanxi (CN); Xinyu Li, Shaanxi (CN); Xingguang Zhou, Shaanxi (CN); Chenglong Wang, Shaanxi (CN); Wenxi Tian, Shaanxi (CN); Suizheng Qiu, Shaanxi (CN); Guanghui Su, Shaanxi (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 144 days.

(21) Appl. No.: 17/871,792

(22) Filed: Jul. 22, 2022

(65) Prior Publication Data
US 2022/0375634 A1    Nov. 24, 2022

(30) Foreign Application Priority Data
Aug. 30, 2021    (CN) .......................... 202111007621.9

(51) Int. Cl.
G21C 15/12    (2006.01)
F28D 7/00    (2006.01)
F28D 7/16    (2006.01)
G21C 15/243    (2006.01)

(52) U.S. Cl.
CPC .......... *G21C 15/12* (2013.01); *F28D 7/0066* (2013.01); *F28D 7/16* (2013.01); *G21C 15/243* (2013.01)

(58) Field of Classification Search
CPC ...... G21C 15/12; G21C 15/14; G21C 15/243; G21C 1/32; F28D 7/0066–0083
USPC ................................ 376/402, 404, 405, 406
See application file for complete search history.

(56) References Cited

U.S. PATENT DOCUMENTS

| | | | | |
|---|---|---|---|---|
| 4,098,329 A | * | 7/1978 | Culver .................. | F28D 7/1669 165/158 |
| 4,235,284 A | * | 11/1980 | Coleman ............... | F28D 7/0083 165/158 |
| 2004/0151273 A1 | * | 8/2004 | Lahoda ..................... | G21C 7/00 376/211 |

* cited by examiner

*Primary Examiner* — Jack W Keith
*Assistant Examiner* — Daniel Wasil

(57) ABSTRACT

A nuclear reactor main heat and waste heat integrated thermal exchanger has a first coolant zone for a first main heat loop, a second coolant zone for a second main heat loop and a third coolant zone for a waste heat removal loop. The first coolant for the first main heat loop passes through the first coolant inlet, and then reaches the orifice plate, and finally flows out from the first coolant outlet. The second coolant for the second main heat loop passes through the second coolant inlet, and then reaches the lower tube sheet, and finally flows out from the second coolant outlet. The third coolant for the waste heat removal loop enters the entrance sleeve through the third coolant inlet, and then enters multiple tubes of the tube bundle, and then enters the exit sleeve, and finally flows out from the third coolant outlet.

1 Claim, 1 Drawing Sheet

NUCLEAR REACTOR MAIN HEAT AND WASTE HEAT INTEGRATED THERMAL EXCHANGER

CROSS REFERENCE OF RELATED APPLICATION

The present invention claims priority under 35 U.S.C. 119 (a-d) to CN 202111007621.9, filed Aug. 30, 2021.

BACKGROUND OF THE PRESENT INVENTION

Field of Invention

The present invention relates to the field of advanced nuclear energy development technology, and more particularly to a nuclear reactor main heat and waste heat integrated thermal exchanger.

Description of Related Arts

In order to match the advantages of the small nuclear reactors with small size, light weight and low cost, it is urgent to develop a corresponding main thermal exchanger and a corresponding waste thermal exchanger for the small nuclear reactors, so as to ensure that the reactors are able to effectively export decay heat under normal shutdown and accident conditions, and at the same time, the main thermal exchanger and the waste thermal exchanger have a small enough volume to fit in the confined space inside the reactors. However, the two types of thermal exchangers usually work independently of each other, which poses a great challenge to volume reduction. To sum up, it is necessary to for the main heat and waste thermal exchangers of the small nuclear reactors to be compact and integrated in structure, which should not occupy too much volume, and at the same time, should ensure the heat transfer intensity and minimize thermal stress. Therefore, it is necessary for reactor engineering to develop a main heat and waste heat integrated thermal exchanger for small nuclear reactors, which is helpful to advance the process of autonomous mastery of small nuclear reactor technology in China.

SUMMARY OF THE PRESENT INVENTION

In order to overcome problems in prior arts, the present invention provides a nuclear reactor main heat and waste heat integrated thermal exchanger, which provides the equipment basis for the design of the reactor and residual heat removal system.

To achieve the above object, the present invention provides technical solutions as follows.

A nuclear reactor main heat and waste heat integrated thermal exchanger comprises:

a housing;

a lower cap and an upper cap both of which are fixed at a bottom and a top of the housing respectively, wherein the lower cap has an annular entrance chamber for a second main heat loop, and the upper cap has an annular exit chamber for the second main heat loop;

an entrance sleeve having an entrance chamber for a waste heat removal loop, wherein the entrance sleeve is positioned within the housing and the lower cap, and is provided at a center of the bottom of the housing and a center of the lower cap;

an exit sleeve having an exit chamber for the waste heat removal loop, wherein the exit sleeve is positioned within the upper cap, and is provided at a center of the upper cap; and a tube bundle, which is provided within the housing, comprising multiple tubes, wherein two ends of some of the multiple tubes, which are provided at a middle portion of the housing, are connected with the entrance sleeve and the exit sleeve respectively; two ends of others of the multiple tubes, which are provided around the entrance sleeve, are fixed by an upper tube sheet and a lower tube sheet respectively, wherein:

the thermal exchanger has a first coolant zone for a first main heat loop, a second coolant zone for the second main heat loop and a third coolant zone for the waste heat removal loop;

the first coolant zone is defined by an inner wall of the housing, an outer wall of the entrance sleeve, an outer wall of the exit sleeve and an outer wall of each of the others of the multiple tubes of the tube bundle;

the second coolant zone is defined by the each of the others of the multiple tubes of the tube bundle, the annular entrance chamber and the annular exit chamber;

the third coolant zone is defined by the entrance chamber of the entrance sleeve, the exit chamber of the exit sleeve and each of the some of the multiple tubes of the tube bundle which connect the entrance sleeve with the exit sleeve;

the housing has a first coolant inlet for the first main heat loop and a first coolant outlet for the first main heat loop at one side wall thereof, and at an upper portion and a lower portion thereof within the first coolant zone;

the lower cap has a second coolant inlet for the second main heat loop, the upper cap has a second coolant outlet for the second main heat loop, and the second coolant inlet and the second coolant outlet are diagonally opposite to each other;

the entrance sleeve has a third coolant inlet for the waste heat removal loop at a bottom thereof, the exit sleeve has a third coolant outlet for the waste heat removal loop at a top thereof;

an orifice plate for distributing a flow of a first coolant in the first main heat loop is transversely set below the first coolant inlet and within the first coolant zone, whereby:

the first coolant for the first main heat loop enters the first main heat loop through the first coolant inlet, and then reaches the orifice plate for heat emission, and finally converges and flows out from the first coolant outlet;

a second coolant for the second main heat loop enters the second main heat loop through the second coolant inlet, and then reaches the lower tube sheet for distributing a flow of the second coolant for the second main heat loop and absorbing heat, and finally converges and flows out from the second coolant outlet;

a third coolant for the waste heat removal loop enters the entrance sleeve through the third coolant inlet, and then enters the some of the multiple tubes of the tube bundle for heat absorption, and then enters the exit sleeve, and finally converges and flows out from the third coolant outlet.

Compared with prior arts, the present invention has some beneficial effects as follows.

(1) The second main heat loop and the waste heat removal loop simultaneously exchange heat with the first main heat loop in compact spaces, which improves the heat transfer efficiency.

(2) Countercurrent heat exchange occurs between the first coolant for the first main heat loop and one of the second coolant for the second main heat loop and the third coolant for the waste heat removal loop, which is beneficial to reduce pressure drop and local thermal stress.

(3) The second coolant for the second main heat loop and the third coolant for the waste heat removal loop flow in the same direction, which is beneficial to suppress flow-induced vibration.

(4) The design of integrated main heat transfer and waste heat transfer is conducive to the miniaturization of nuclear reactors.

DETAILED DESCRIPTION OF THE PREFERRED EMBODIMENT

The present invention is further described in detail by taking a small fluoride salt-cooled high temperature reactor as an example in combination with accompanying drawings.

Figure 1:
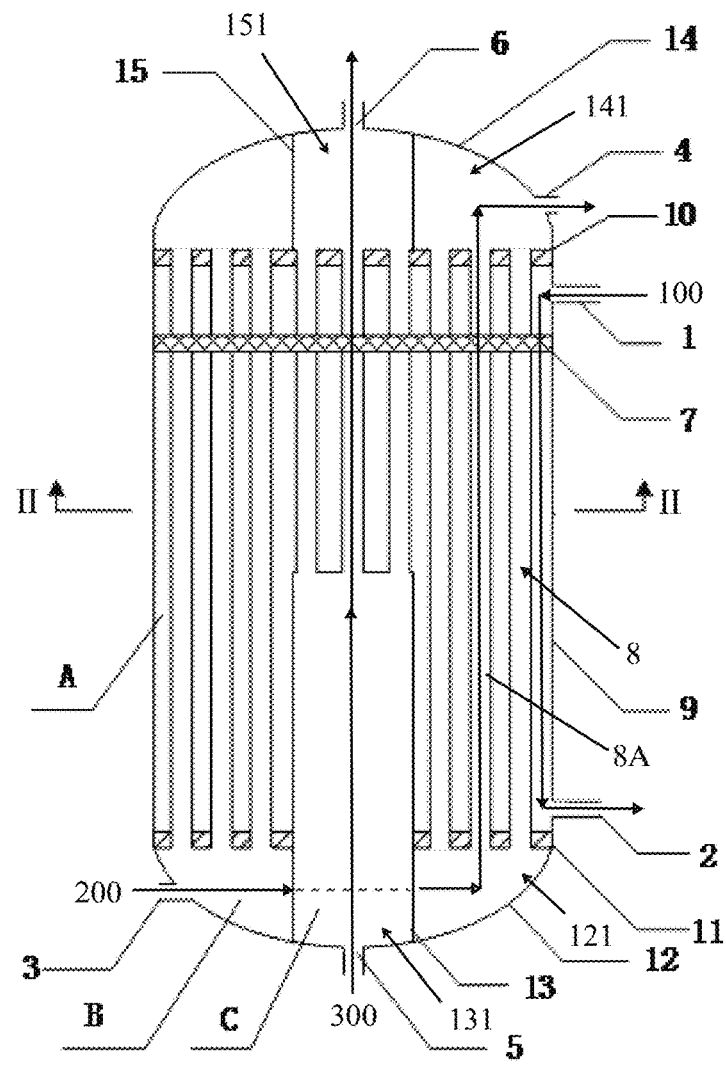
FIG. 1 is a structural schematic diagram of a nuclear reactor main heat and waste heat integrated thermal exchanger provided by the present invention.
Figure 2:
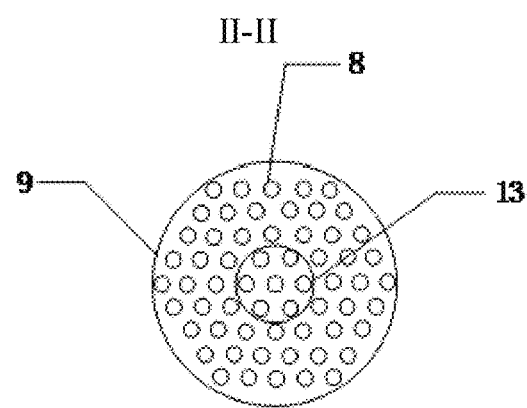
FIG. 2 is a cross-sectional view along a II-II direction of FIG. 1.

Referring to FIGS. 1 and 2, a nuclear reactor main heat and waste heat integrated thermal exchanger according to a preferred embodiment of the present invention is illustrated. The thermal exchanger has a first coolant inlet 1 for a first main heat loop 100, a first coolant outlet 2 for the first main heat loop 100, a second coolant inlet 3 for a second main heat loop 200, a second coolant outlet 4 for the second main heat loop 200, a third coolant inlet 5 for a waste heat removal loop 300, and a third coolant outlet 6 for the waste heat removal loop 300. Moreover, the thermal exchanger comprises an orifice plate 7 for distributing a flow of a first coolant in the first main heat loop 100, a tube bundle 8, a housing 9, an upper tube sheet 10, a lower tube sheet 11, a lower cap 12, an entrance sleeve 13 having an entrance chamber 131 for the waste heat removal loop 300, an upper cap 14, and an exit sleeve 15 having an exit chamber 151 for the waste heat removal loop 300, wherein the lower cap 12 has an annular entrance chamber 121 for the second main heat loop 200, and the upper cap 14 has an annular exit chamber 141 for the second main heat loop 200.

According to the preferred embodiment of the present invention, the tube bundle 8 comprises multiple tubes 8A, wherein two ends of some of the multiple tubes 8A are connected with the entrance sleeve 13 and the exit sleeve 15 respectively; two ends of others of the multiple tubes 8A are fixed by the upper tube sheet 10 and the lower tube sheet 11 respectively; the some of the multiple tubes 8A are provided at a middle portion of the housing 9, the others of the multiple tubes 8A are provided around the some of the multiple tubes 8A.

The thermal exchanger has three fluid zones, that is, a first coolant zone A for the first main heat loop 100, a second coolant zone B for the second main heat loop 200 and a third coolant zone C for the waste heat removal loop 300. The first coolant zone A is defined by an inner wall of the housing 9, an outer wall of the entrance sleeve 13, an outer wall of the exit sleeve 15 and an outer wall of each of the others of the multiple tubes of the tube bundle 8. The second coolant zone B is defined by the each of the others of the multiple tubes of the tube bundle 8, the annular entrance chamber 121 and the annular exit chamber 141. The third coolant zone C is defined by the entrance chamber 131 of the entrance sleeve 13, the exit chamber 151 of the exit sleeve 15 and each of the some of the multiple tubes of the tube bundle 8 which connect the entrance sleeve 13 with the exit sleeve 15.

The first coolant inlet 1 for the first main heat loop 100 and the first coolant outlet 2 for the first main heat loop 100 are provided at one side wall of the housing 9, and provided at an upper portion and a lower portion of the housing 9 within the first coolant zone A. The orifice plate 7 for distributing the flow of a first coolant in the first main heat loop 100 is transversely set below the first coolant inlet 1 and within the first coolant zone A. The second coolant inlet 3 and the second coolant outlet 4 for the second main heat loop 200 are provided at the lower cap 12 and the upper cap 14 respectively and are diagonally opposite to each other. The third coolant inlet 5 and the third coolant outlet 6 for the waste heat removal loop 300 are provided at a bottom of the entrance sleeve 13 and a top of the exit sleeve 15 respectively.

Referring to FIG. 1, the first coolant for the first main heat loop 100 enters the first main heat loop 100 through the first coolant inlet 1, and then reaches the orifice plate 7 for heat emission, and finally converges and flows out from the first coolant outlet 2. A second coolant for the second main heat loop 200 enters the second main heat loop 200 through the second coolant inlet 3, and then reaches the lower tube sheet 11 for distributing a flow of the second coolant for the second main heat loop 200 and absorbing heat, and finally converges and flows out from the second coolant outlet 4. A third coolant for the waste heat removal loop 300 enters the entrance sleeve 13 through the third coolant inlet 5, and then enters the some of the multiple tubes of the tube bundle 8 for heat absorption, and then enters the exit sleeve 15, and finally converges and flows out from the third coolant outlet 6.

The number and size of the tube bundle 8 are dependent on specific working conditions, and here the number and size of the tube bundles 8 are not determined.

The above content is a further detailed description of the present invention in combination with the specific preferred embodiment, and it is unable to be considered that the specific embodiment of the present invention is limited to this. For those skilled in the art, without departing from the concept of the present invention, any simple deduction or replacement should fall within the protection scope determined by the claims of the present invention.

What is claimed is:

1. A nuclear reactor main heat and waste heat integrated thermal exchanger comprising:
a housing;
a lower cap and an upper cap both of which are fixed at a bottom and a top of the housing respectively, wherein the lower cap has an annular entrance chamber for a second main heat loop, and the upper cap has an annular exit chamber for the second main heat loop;
an entrance sleeve having an entrance chamber for a waste heat removal loop, wherein the entrance sleeve is positioned within the housing and the lower cap, and is provided at a center of the bottom of the housing and a center of the lower cap;

an exit sleeve having an exit chamber for the waste heat removal loop, wherein the exit sleeve is positioned within the upper cap, and is provided at a center of the upper cap; and a tube bundle, which is provided within the housing, comprising multiple tubes, wherein two ends of some of the multiple tubes, which are provided at a middle portion of the housing, are connected with the entrance sleeve and the exit sleeve respectively; two ends of others of the multiple tubes, which are provided around the entrance sleeve, are fixed by an upper tube sheet and a lower tube sheet respectively, wherein:

the thermal exchanger has a first coolant zone for a first main heat loop, a second coolant zone for the second main heat loop and a third coolant zone for the waste heat removal loop;

the first coolant zone is defined by an inner wall of the housing, an outer wall of the entrance sleeve, an outer wall of the exit sleeve and an outer wall of each of the others of the multiple tubes of the tube bundle;

the second coolant zone is defined by an interior of each of the others of the multiple tubes of the tube bundle, the annular entrance chamber and the annular exit chamber;

the third coolant zone is defined by the entrance chamber of the entrance sleeve, the exit chamber of the exit sleeve and each of the some of the multiple tubes of the tube bundle which connect the entrance sleeve with the exit sleeve;

the housing has a first coolant inlet for the first main heat loop and a first coolant outlet for the first main heat loop at one side wall thereof, and at an upper portion and a lower portion thereof within the first coolant zone;

the lower cap has a second coolant inlet for the second main heat loop, the upper cap has a second coolant outlet for the second main heat loop, and the second coolant inlet and the second coolant outlet are diagonally opposite to each other;

the entrance sleeve has a third coolant inlet for the waste heat removal loop at a bottom thereof, the exit sleeve has a third coolant outlet for the waste heat removal loop at a top thereof;

an orifice plate for distributing a flow of a first coolant in the first main heat loop is transversely set below the first coolant inlet and within the first coolant zone, whereby:

the first coolant for the first main heat loop enters the first main heat loop through the first coolant inlet, and then reaches the orifice plate for heat emission, and finally converges and flows out from the first coolant outlet;

a second coolant for the second main heat loop enters the second main heat loop through the second coolant inlet, and then reaches the lower tube sheet, then enters the others of the multiple tubes of the tube bundle for distributing a flow of the second coolant for the second main heat loop and absorbing heat, and finally converges and flows out from the second coolant outlet;

a third coolant for the waste heat removal loop enters the entrance sleeve through the third coolant inlet, and then enters the some of the multiple tubes of the tube bundle for heat absorption, and then enters the exit sleeve, and finally converges and flows out from the third coolant outlet.

* * * * *